(12) United States Patent
Pezzuto et al.

(10) Patent No.: US 6,418,968 B1
(45) Date of Patent: Jul. 16, 2002

(54) POROUS MICROFLUIDIC VALVES

(75) Inventors: Marci Pezzuto, Altadena; Stephen D. O'Connor, Pasadena, both of CA (US)

(73) Assignee: Nanostream, Inc., Pasadena, CA (US)

( * ) Notice: Subject to any disclaimer, the term of this patent is extended or adjusted under 35 U.S.C. 154(b) by 0 days.

(21) Appl. No.: 09/839,547

(22) Filed: Apr. 20, 2001

(51) Int. Cl.[7] ............................ G05B 7/00; F15B 21/00
(52) U.S. Cl. ............................... 137/833; 204/601
(58) Field of Search ..................... 137/833, 803; 204/601

(56) References Cited

U.S. PATENT DOCUMENTS

| | | | |
|---|---|---|---|
| 3,568,692 A | * | 3/1971 | Metzger et al. |
| 3,680,576 A | * | 8/1972 | Kiwak .................... 137/833 |
| 3,783,902 A | * | 1/1974 | Schwarz et al. .......... 137/803 |
| 5,922,591 A | | 7/1999 | Anderson et al. ........ 435/287.2 |
| 6,043,080 A | | 3/2000 | Lipshutz et al. ......... 435/287.2 |
| 6,074,725 A | | 6/2000 | Kennedy .................. 428/188 |
| 6,296,020 B1 | | 10/2001 | McNeely et al. ......... 137/806 |

FOREIGN PATENT DOCUMENTS

| | | | |
|---|---|---|---|
| DE | 197 39 722 | 9/1997 | ............ H05K/3/36 |
| WO | WO 99/19717 | 4/1999 | .......... G01N/25/22 |
| WO | WO 99/60397 | 11/1999 | ......... G01N/33/483 |
| WO | WO 01/07506 | 2/2001 | ............. C08J/5/00 |
| WO | WO 01/09598 | 2/2001 | .......... G01N/27/26 |

* cited by examiner

*Primary Examiner*—A. Michael Chambers
(74) *Attorney, Agent, or Firm*—Lyon & Lyon LLP (57) ABSTRACT

Microfluidic devices having porous membrane valves, which are microfluidic channels or elements having porous materials that restrict fluid flow rate for a given pressure, are provided. Multiple microfluidic valves of this invention can be constructed on a single device so that they have different valving capabilities or impedances, and in unison can control the overall direction of fluid flow. Impedance regions may be constructed in various ways, such as, for example: by inserting porous materials into or between channels; by sandwiching a sheet or layer of porous material between other layers of the device (preferably in stencil form); or by inserting a liquid, solution, slurry, or suspension into microfluidic channels, and then permitting the formation of porous deposits by promoting at least partial evaporation. Adhesive tape may be used for one or more layers of the device.

27 Claims, 7 Drawing Sheets

POROUS MICROFLUIDIC VALVES

FIELD OF THE INVENTION

The present invention relates to microfluidic devices that have built-in means for controlling fluid flow.

SUMMARY OF THE INVENTION

This invention relates to the microfluidic devices that contain built-in means for controlling fluid flow. In one aspect of the present invention, certain sections of microfluidic channels contain porous materials that inhibit fluid flow. These sections are referred to herein as porous membrane valves. In use, when fluid encounters these regions, fluid flow will be inhibited until sufficient pressure is provided for the fluid to overcome the impedance provided by the porous materials.

In certain embodiments, these microfluidic devices consist of sandwiched stencils as in U.S. patent application Ser. No. 09/453,029. The impedance regions can be constructed within the channels in a number of ways. In a preferred embodiment, porous materials are inserted into or between channels to form the impedance region. In another preferred embodiment, the impedance region is a sheet or layer of material that forms one of the stencil layers of the device. Fluid travels through channels in one layer of a device and passes through vias (apertures between layers) that lead through the stencil layer composing the impedance region to channels on an upper or lower layer of the device. In other embodiments, an impedance region may be constructed by inserting or flowing one or more ingredients into a channel and allowing the ingredients to partially or fully solidify, such as by partial or complete evaporation. The flowing ingredient(s) from which the impedance region is constructed may be a liquid, slurry, or suspension of polymers, inorganic materials, or other materials known in the filtering art.

Multiple microfluidic valves described here can be built into a single device. The valves can have similar or very different impedances, depending on numerous factors including the composition of the materials or geometry used to construct the valves.

Definitions

The term "channel" as used herein is to be interpreted in a broad sense. Thus, it is not intended to be restricted to elongated configurations where the transverse or longitudinal dimension greatly exceeds the diameter or cross-sectional dimension. Rather, such terms are meant to comprise cavities or tunnels of any desired shape or configuration through which liquids may be directed. Such a fluid cavity may, for example, comprise a flow-through cell where fluid is to be continually passed or, alternatively, a chamber for holding a specified, discrete amount of fluid for a specified amount of time. "Channels" may be filled or may contain internal structures comprising valves or equivalent components.

The term "microfluidic" as used herein is to be understood, without any restriction thereto, to refer to structures or devices through which fluid(s) are capable of being passed or directed, wherein one or more of the dimensions is less than 500 microns.

The term "porous membrane valves" as used herein describes a portion of, or an interface with, a microfluidic channel or element that restricts fluid flow rate for a given pressure using a porous material. A restriction of flow rate for a particular pressure may also be called an impedance. An incredibly wide variety of materials may be used to create a porous membrane valve, as would be recognized by one skilled in the art of filtering. Factors that may affect the impedance caused by a particular porous membrane valve include, but are not limited to, the following: membrane dimensions; network geometry between a membrane and associated inlet or outlet channels; membrane pore size/void volume; membrane pore geometry (for example, if pores are randomly dispersed or aligned with the direction of fluid flow); and membrane material, including any chemical interaction between the membrane and a working fluid (for example, if the membrane is composed of hydrophobic material and an aqueous solution flows in the device).

DETAILED DESCRIPTION OF THE PREFERRED EMBODIMENTS

This invention relates to the microfluidic devices that contain built-in means for controlling fluid flow. In one aspect of the present invention, certain sections of the microfluidic channels contain porous materials that inhibit fluid flow. In use, when fluid encounters these regions, fluid flow will be inhibited until sufficient pressure is provided for the fluid to overcome the impedance provided by the porous materials. Multiple microfluidic valves of this invention can be constructed on a single device so that they have different valving capabilities or impedances, and in unison can control the overall direction of fluid flow.

In certain embodiments, these microfluidic devices consist of sandwiched stencils as in U.S. patent application Ser. No. 09/453,029, which is incorporated herein by reference. The impedance regions can be constructed within the channels in a number of ways. In a preferred embodiment, porous materials are inserted in or between the channels and form the impedance region. These porous materials are constructed such that a pressure drop occurs from one side of the material to the other and inhibits, but does not block, fluid flow within a desired pressure range. In another preferred embodiment, the impedance region is a sheet or layer of material that forms one of the stencil layers of the device. Fluid travels through channels in one layer of a device and passes through vias that lead through the stencil layer composing the impedance region to channels on an upper or lower layer of the device. In other embodiments, an impedance region may be constructed by inserting or flowing one or more fluidic ingredients into a channel and allowing the ingredients to partly or fully solidify. The fluidic ingredient(s) from which the impedance region is constructed may be a liquid, solution, slurry, or suspension of polymers, ceramics, or other materials, including inorganic materials.

In certain embodiments of the invention, porous membranes are used to direct and control fluid flow within a microfluidic device. Porous membranes have several properties, such as pore size, chemical interaction with a working fluid (for example, hydrophobicity or hydrophillicity with regard to aqueous solutions), and void volume, that determine the fluid intrusion pressures and flow through rates of a particular membrane. These characteristics can be utilized within a microfluidic device to manipulate the fluid in a desired way.

Various hydrophobic membranes are manufactured with various fluid intrusion pressures. In one embodiment, several membranes with different fluid intrusion pressures can be configured within a microfluidic device to create valves of various impedances.

In another preferred embodiment, material can be packed inside a channel or via to provide the valving mechanism. Various filter materials are available for this purpose, including silica gel, polymeric beads, glass beads, and other materials used in chromatography. Other equivalent materials are commonly known in the filtering art.

In use, pressure or other means cause fluid to flow through a channel. When the fluid front reaches a region where the porous membrane valves are located, the fluid flow is inhibited from passing the porous membrane until the impedance caused by the membrane is overcome by an increased pressure within the channel. In certain embodiments, the fluid does begin to flow into the porous material, but flows slowly. The fluid flow rate through the material will generally be proportional to the backpressure.

As noted above, many factors can affect the profile of fluid flow rate versus backpressure for flow through a given porous material. These factors include, but are not limited to, the chemical nature of the membrane, pore size of the membrane, geometry and shape of the pores in the membrane, amount of surface area of the membrane, size of the opening where the fluid will flow through, and other parameters. The nature of the fluid that is flowed will also have an effect. Fluid factors include but are not limited to composition of the fluid, surface tension of the fluid, viscosity of the fluid, temperature, and compressibility of the fluid.

Devices according to the present invention can be constructed in a variety of ways. A few examples are shown.

Figure 1A:
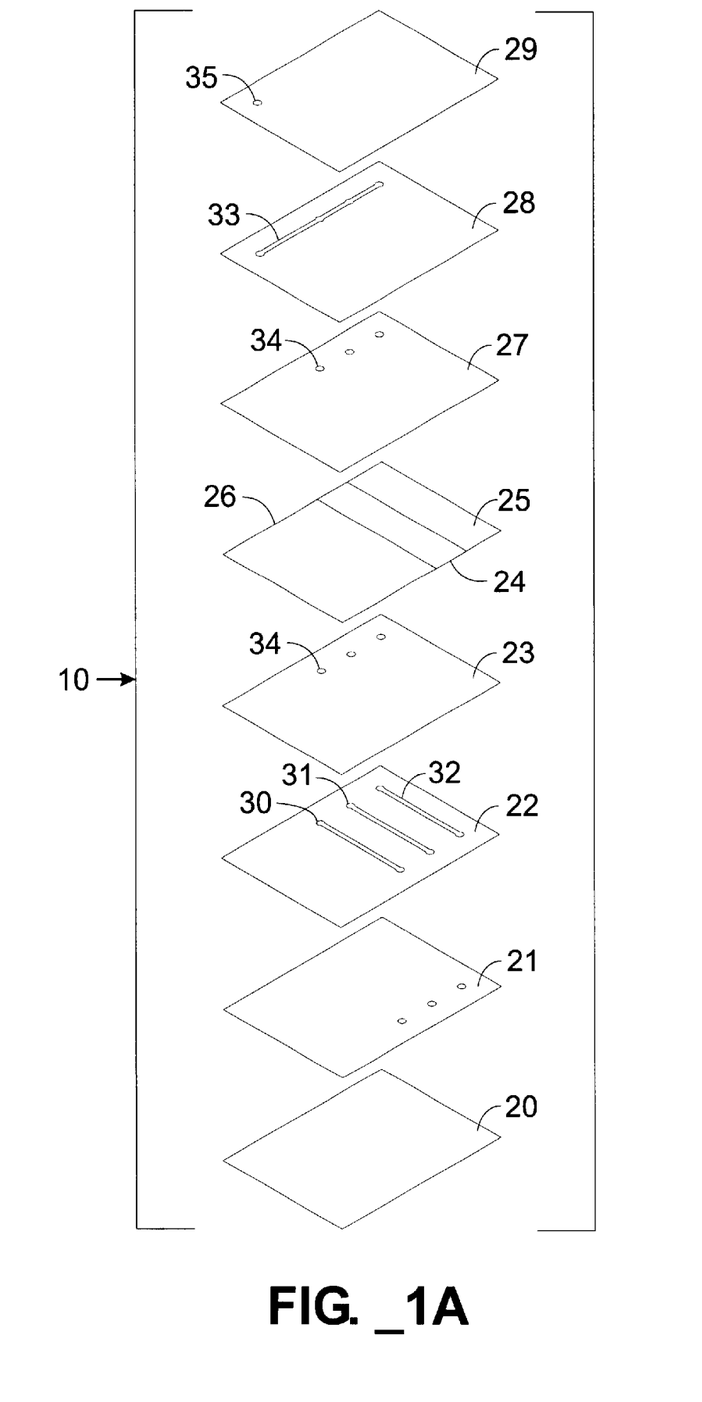
FIG. 1A shows an exploded view of a first microfluidic device having three microfluidic valves.

Referring to FIG. 1A, a microfluidic device 10 is constructed from ten stencil layers 20–29 from which channels 30–33, vias 34, and an inlet aperture 35 have been removed. The stencil layers 24–26 are all on the same layer and are composed of three different porous membranes. Stencil 26 is composed of 40-micron pore size ultra high molecular weight polyethylene (UHMWPE), which is hydrophobic. Stencil 25 is composed of 2.5–4.5 micron pore size UHMWPE. Stencil 24 is composed of 25-micron pore size UHMWPE. Stencil layer 20 is also a porous material and composed of 1–2 micron pore size PTFE. Stencil layers 21, 23, 27 are composed of single-sided tape having a 2 mil polyester carrier with 0.8 mil acrylic adhesive. Stencil layers 22 and 28 are double-sided tape composed of 0.5 mil thick polyester carrier with 1.8 mil thick acrylic adhesive on both sides. Stencil layer 29 is a ⅛" polycarbonate base with a 0.38 inch diameter hole drilled to form an inlet port 35.

Figure 1B:
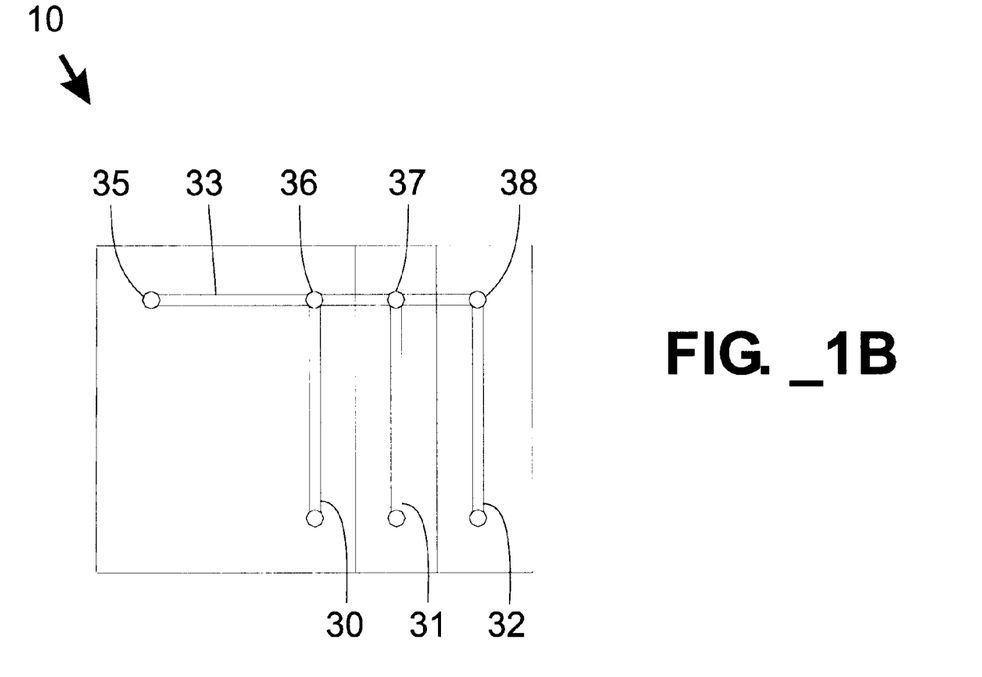
FIG. 1B shows a top view of the device of FIG. 1A.

The assembled device 10 is shown in FIG. 1B and the three valve regions are marked 36–38. In use, colored water was injected at inlet port 35 at a flow rate of 10 microliters per minute. The fluid filled the channel 33 completely and stopped at each of the valve regions 36–38. Then, further pressure was applied to the inlet until valve 36 was overcome. The valve 36 includes the combination of the porous material 26 and the vias 34. Valve 36 was overcome first because the 40-micron pore size material passes water more easily than do the others. When the fluid filled channel 30, the fluid front encounters the porous material that composes stencil layer 20. The fluid wants to pass through stencil layer 20 even less than through the next valve, so valve 37 is overcome. Once channel 31 is filled, valve 38 is overcome.

Figure 2A:
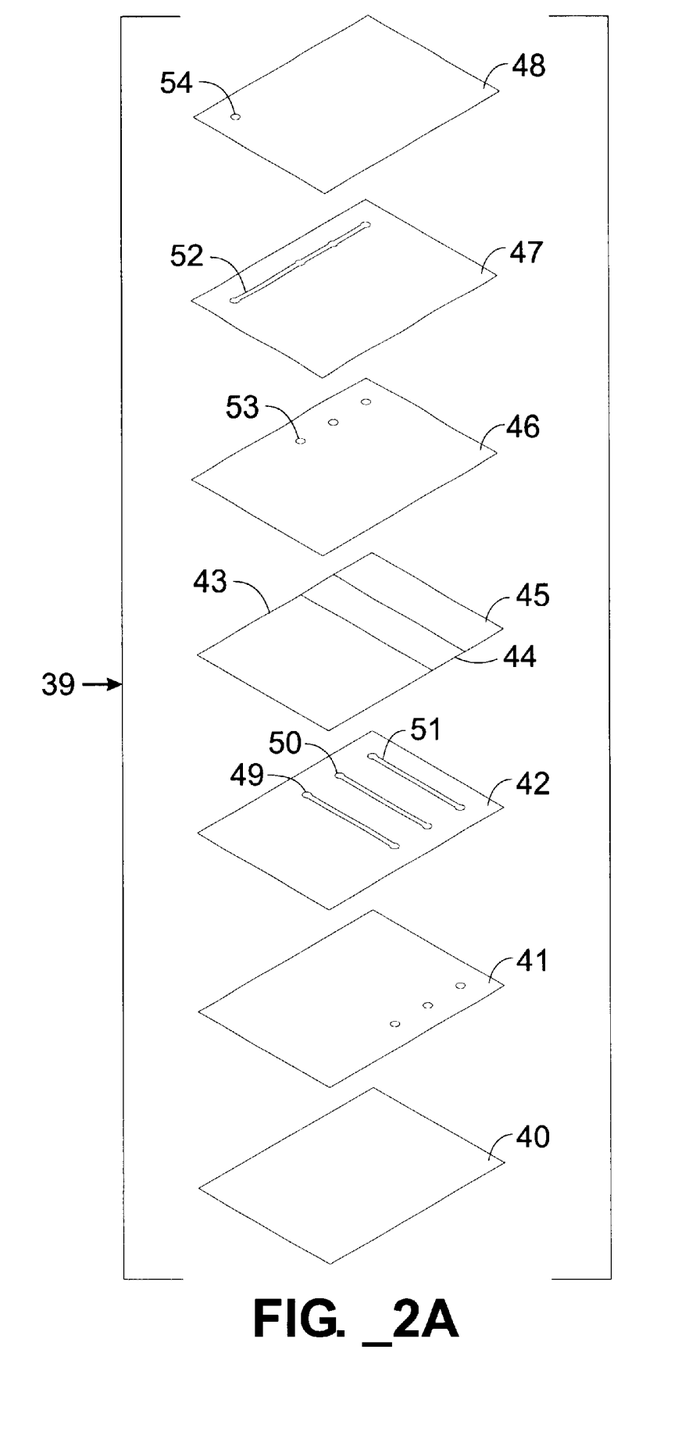
FIG. 2A shows an exploded view of a second microfluidic device having three microfluidic valves.
Figure 2B:
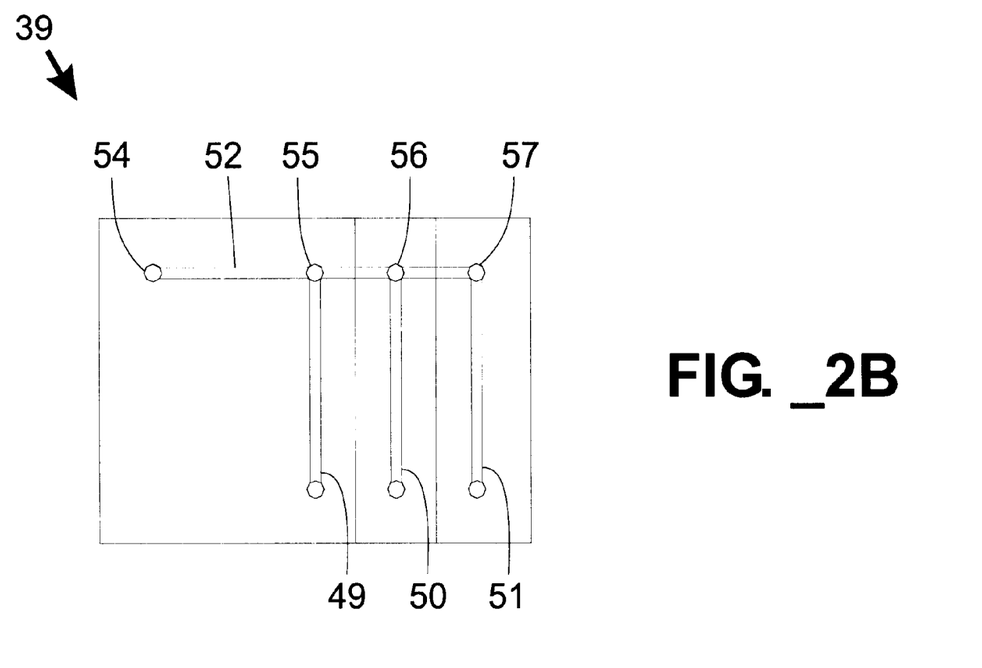
FIG. 2B shows a top view of the device of FIG. 2A.

Another microfluidic device 39 with built-in valving is shown in FIGS. 2A–B. This device 39 is similar to the device 10 shown in FIGS. 1A–1B, except the porous material stencil layers actually form one surface of the channels. Referring to FIG. 2A, a microfluidic device is constructed from nine stencil layers 40–48 from which channels, 49–52, vias 53, and an inlet aperture 54 have been removed. The stencil layers 43–45 are all on the same layer and are composed of three different porous membranes. Stencil 43 is composed of 40-micron pore size ultra high molecular weight polyethylene (UHMWPE), which is hydrophobic. Stencil 45 is composed of 2.5–4.5 micron pore size UHMWPE. Stencil 44 is composed of UHMWPE with 25-micron pore size. Stencil layer 40 is also a porous material and composed of 1–2 micron pore size PTFE. Stencil layers 41 and 46 are composed of single-sided tape that is 2 mil polyester carrier with 0.8 mil acrylic adhesive. Stencil layers 42 and 47 are double-sided tape composed of 0.5 mil thick polyester carrier with 1.8 mil thick acrylic adhesive on both sides. Stencil layers 48 is a ⅛" polycarbonate base with a 0.38 inch diameter aperture drilled to form an inlet port 35.

The assembled device 39 is shown in FIG. 2B. The device functioned identically to the device 10 shown in FIG. 1.

In certain occasions, it may be preferable to fashion each stencil layer from a single material. A device such as this can be constructed by forming vias in the porous materials themselves and having entire sheets of the porous material forming individual layers.

Figure 3A:
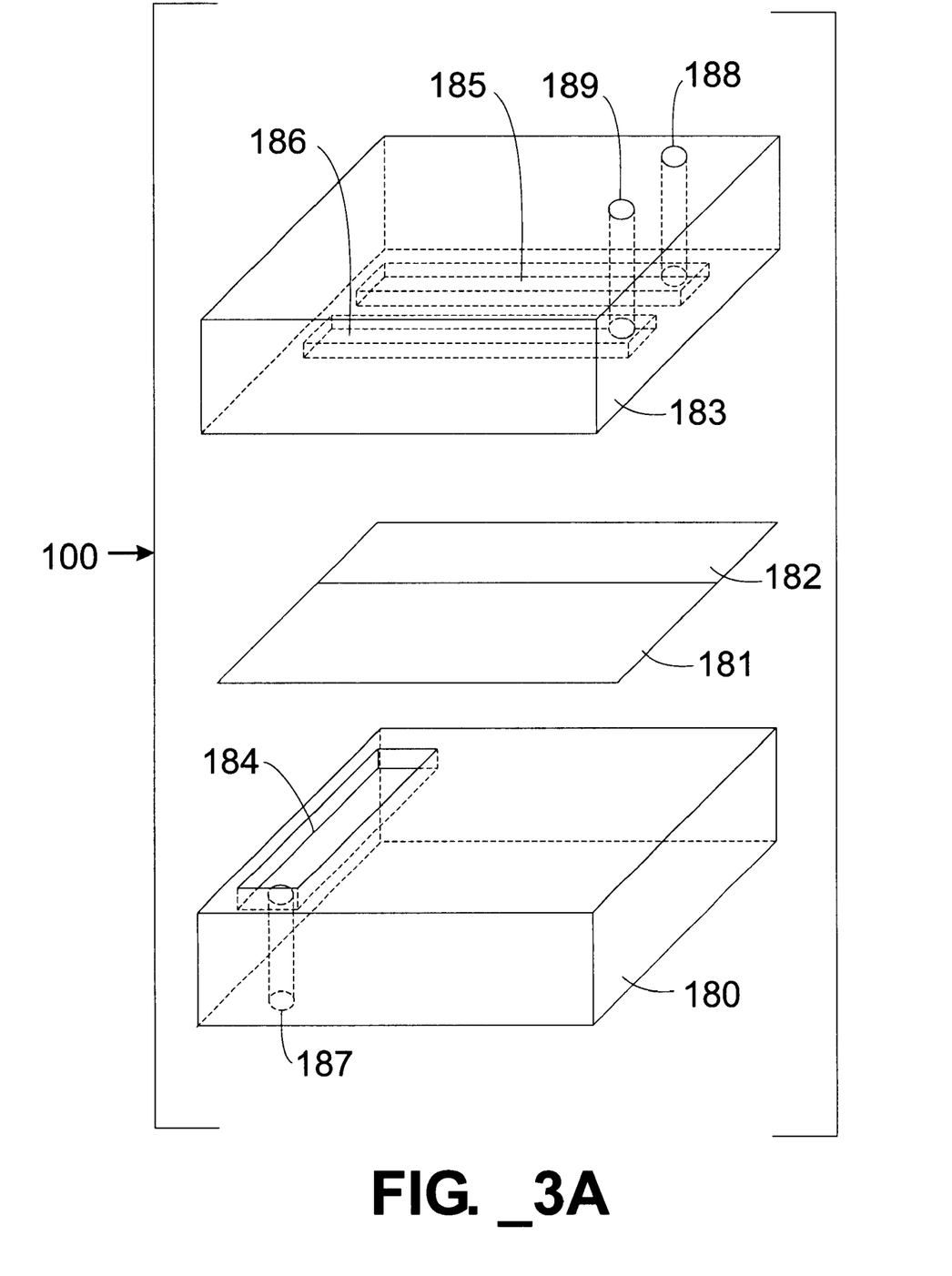
FIG. 3A shows an exploded perspective view of a third microfluidic device having two microfluidic valves.

The invention can also be practiced using traditional microfluidic construction techniques such as etching channels in glass or silicon or embossing channels in polymeric materials. Referring to FIG. 3A, a microfluidic device 100 is composed of four parts 180–183, two parts made by recessing channels in substrates 180, 183 and two parts that are porous materials 181, 182. The bottom substrate 180 has a channel 184 that has been recessed by techniques such as, e.g., etching or embossing. Also, a via 187 has been created all the way through the substrate 180. This via 187 can be produced, for example, by a secondary etch or by drilling. A top plate 183 is constructed with two recessed channels 185, 186 and two vias 188, 189. Two different porous areas 181, 182 are sandwiched between the recessed portions of the substrates 180, 183. In this example, the porous areas 181, 182 are made of identical materials but have different pore sizes. For example, porous area 182 is 5-micron pore size and member 181 is 25-micron pore size. The porous areas 181, 182 preferably, but do not necessarily, occupy a common layer. The substrates 180, 183 may be bonded to the porous members 181–182 in a variety of ways. For example, a layer of adhesive can be applied to the top layer of 180 and bottom layer of 183 and the devices sandwiched together. Other bonding methods, as discussed in U.S. patent application Ser. No. 09/453,029 (which is incorporated herein by reference in its entirety), may be employed. Such methods include, but are not limited to, ultrasonic welding and thermal treatment.

Figure 3B:
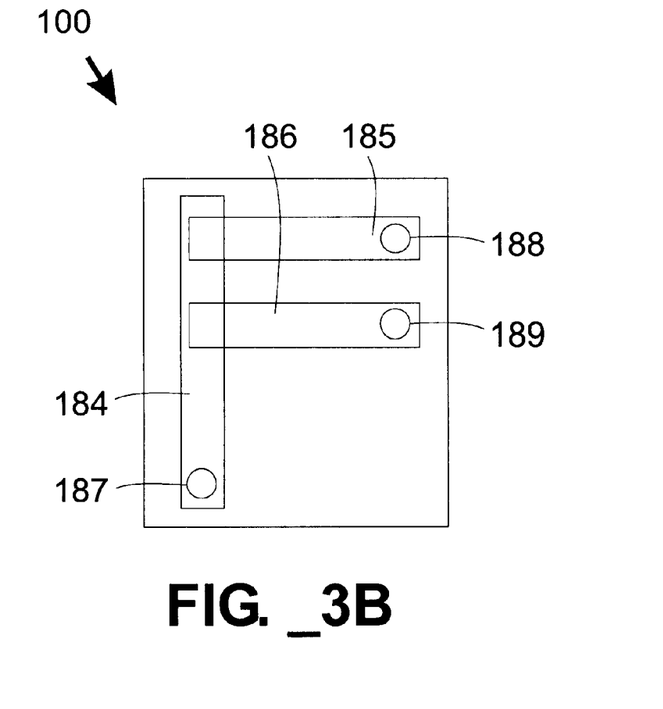
FIG. 3B shows a top view of the assembled device of FIG. 3A.

The assembled device 100 is shown in FIG. 3B. In use, fluid is injected at port 187 and passes through channel 184. During the filling of the channel 184, fluid does not enter channels 185 or 186 until channel 184 is completely full, due to the excess pressure required to overcome the filter area 181, 182. Once the channel 184 is completely filled, fluid passes through filter area 181 first, due to the larger pore size and thus smaller pressure drop required, and fills channel 186. If exit 189 is blocked, then pressure will build up and the fluid will pass through filter 182 and fill channel 185.

Figure 4A:
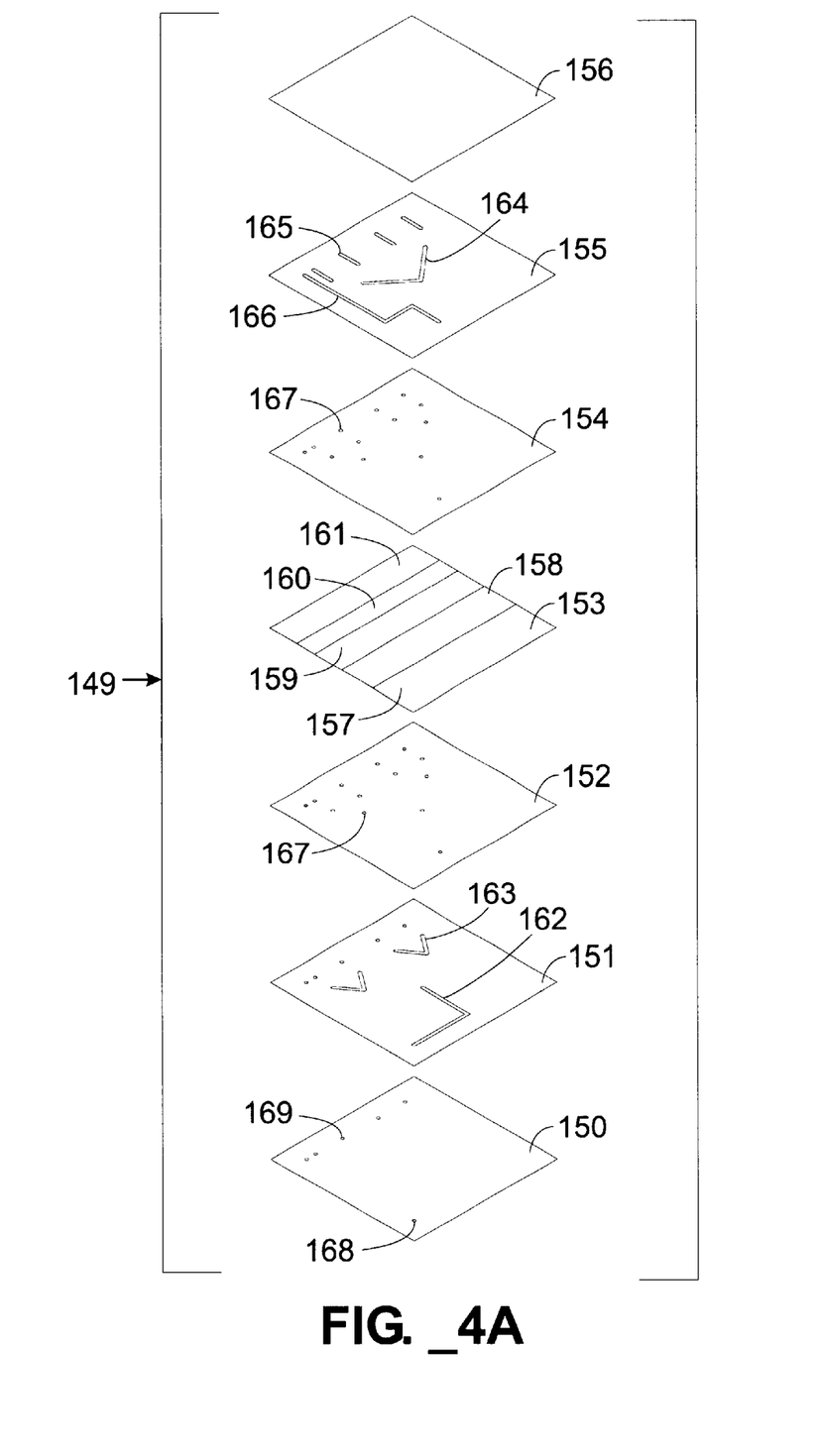
FIG. 4A shows an exploded view of a microfluidic device that meters a sample and splits it into four equal portions using the porous membrane valves of the current invention.
Figure 4B:
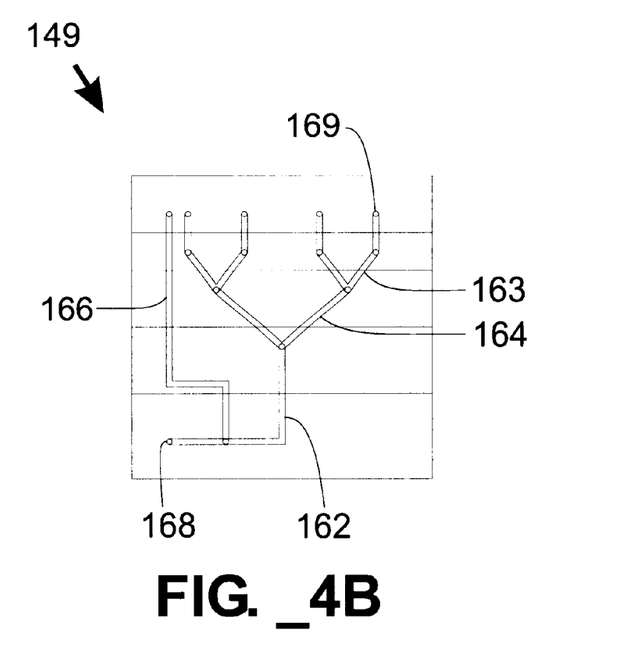
FIG. 4B shows a top view of the assembled device of FIG. 4A.

In another embodiment, porous membrane valves can be used in a device to create a microfluidic metering system. Referring to FIG. 4A, an exploded view of a microfluidic device 149 is shown that was constructed from seven stencil layers 150–156. Defined in the layers are channels 162–166, vias 167, an entry port 168, and exit ports 169. Stencil layer 153 is constructed from five different porous materials. Area 157 is 40-micron pore size UHMWPE, area 158 is 30-micron pore size UHMWPE, area 159 is 20-micron pore size UHMWPE, area 160 is 10-micron pore size UHMWPE, and area 161 is 1-micron pore size UHMWPE. Stencil layers 152 and 154 are constructed from single-sided adhesive tape with the adhesive facing stencil 153, stencil layers 151 and 155 are double sided adhesive tape, and stencil layers 150 and 156 are polymeric films with no adhesive. For examples of the materials that can be used, see U.S. patent application Ser. No. 09/453,029. The assembled device 149 is shown in FIG. 4B. In use, a small portion of fluid is injected at the entry port 168 and passes down channel 162 until it reaches the end of the channel. The portion of fluid should be large enough to fill the metering portion of channel 162, but not greater than the total volume of channels 162 and 166. The excess fluid then passes through porous membrane area 157 into waste channel 166 since the pressure drop across membrane area 157 is the weakest of the five areas 157–161. Air is injected behind the fluid to drive the flow. Once the waste fluid reaches the end of channel 166, the fluid in channel 162 passes through membrane area 158, since the pressure drop across area 158 is weaker than the drop across area 161 at the exit of the channel 166. The plug of fluid passes through membrane area 158 and then is split equally in multiple channels 164. The volume of each channel 164 is exactly one-half the volume of the metering portion of channel 162. Once channel 164 is filled, the two plugs of fluid pass through area 159 and enter into channels 163. Each channel 163 is exactly one-quarter of the volume of channel 162. Once each channel 163 is filled, the fluid passes through membrane area 160 and goes to the exit ports 169. In summary, this device 149 takes an uncertain volume of fluid, meters off a known amount, and splits that sample into four equal portions for further analysis. The porous membrane valves control the fluidic pathway in the device.

In a preferred embodiment, different porous membranes can be used to control the flow rate (and therefore total volume) down a given channel. At a given backpressure, membranes of different porosities and void volumes will have different flow-through rates.

Figure 5A:
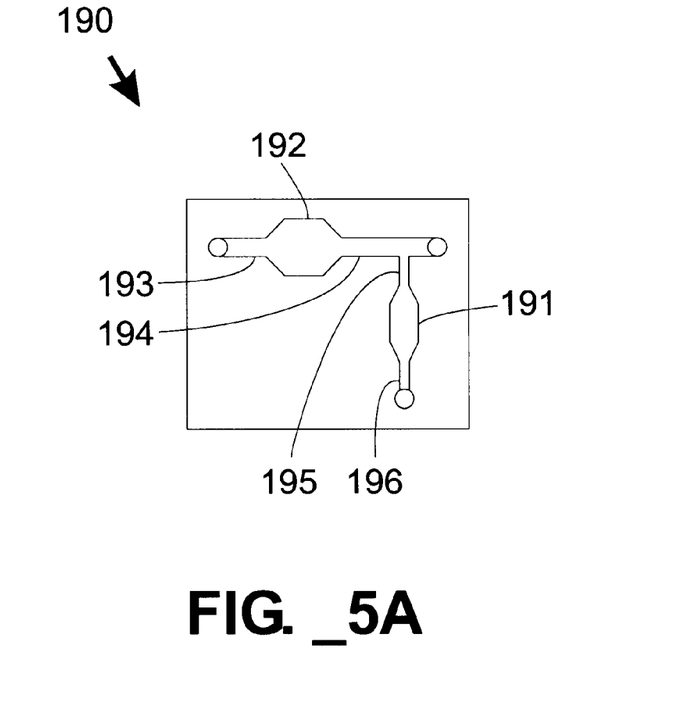
FIG. 5A shows a top view of a microfluidic device including two empty chambers.
Figure 5B:
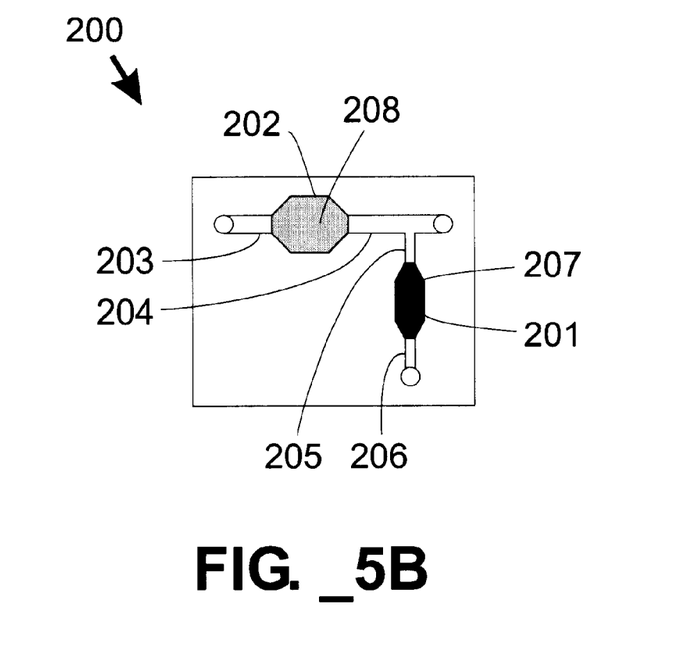
FIG. 5B shows a top view of a microfluidic device including two chambers each having a porous membrane.

In another embodiment, porous membrane valves may be constructed within the same layer as their associated inlet and outlet channels. Referring to FIG. 5A, a microfluidic device 190 includes two empty chambers 191, 192 defined in a common layer with fluid channels 193–196. The device 190 is preferably constructed from multiple layers of material, with the chambers 191, 192 and channels 193–196 formed in a stencil layer sandwiched between other layers. FIG. 5B shows a microfluidic device 193 having chambers 201, 202 and channels 203–206 similar to those provided in FIG. 5A, but with the addition of porous membranes 207, 208 to the chambers 201, 202. The porous membranes 207, 208 may be added to the chambers 201, 202 according to various methods, including, but not limited to, the following: silk screening (as discussed in U.S. application Ser. No. 09/453,029), placing or packing membrane elements in place, or flowing ingredients into the chamber 201, 202 and allowing the ingredients to partially or fully solidify. Flowing ingredients from which the impedance region is constructed may include liquids, slurries, or suspensions of materials including polymers, inorganic materials, or other materials known in the filtering art. For example, a suspension of glass beads in liquid such as an alcohol may be introduced into chambers 201, 202 during fabrication, and then the liquid may be evaporated, in part or in full, prior to sealing the device 200. Following evaporation, the glass beads remain in the respective chambers 201, 202 to form a porous membrane. If desired, beads of different sizes or materials may be used for membranes 207, 208 to provide substantially different impedances. If solid membranes are placed in and used with chambers 201, 202, then a wide variety of filter materials may be used, as would be appreciated by one skilled in the art. Very similar or substantially different filter materials may be used to form the various membrane valves that may be present in a particular device, such as the device 200 shown in FIG. 5B.

Surprisingly, it has been observed that the use of the same filter material for two porous membrane valves in a single device still tends to result in the valves having different impedances. That is, when fluid injected into a microfluidic device is in simultaneous communication with multiple porous membrane valves—each located along the same channel, each fabricated from the same material, and each fabricated in the same geometry and according to the same method—one valve always appears to "break" or permit the passage of fluid before the other(s). However, in such a situation it is impossible to predict which valve will break first. When it is desirable to facilitate predictable flow of fluid within a microfluidic device having multiple membrane valves, preferably the impedance of each membrane valve in fluid communication with a particular channel is intentionally constructed to be distinct from the other(s), such as, for example, by different membrane geometry or dimensions, different interface geometry, different pore size, and/or different materials.

As would be appreciated by one skilled in the art, additional factors that may affect the flow within microfluidic devices incorporating porous membrane valves according to the present invention include, but are not limited to: materials used to fabricate the devices; geometry of the channels and interfaces between channels, including shapes and sizes of openings between and into channels; geometry of channel and filter interfaces; and the type, nature and physical properties of the working fluid(s) used, including surface tension effects of fluids, such as with the addition of soap; temperature; and pressure.

The particular porous membranes, device configurations, and construction methods illustrated and described herein are provided by way of example only, and are not intended to limit the scope of the invention. The scope of the invention should be restricted only in accordance with the appended claims and their equivalents.

What is claimed is:

1. A microfluidic device comprising:
   a first layer including at least one first layer channel therein, the at least one first layer channel having at least one dimension smaller than 500 microns;
   a second layer including at least one second layer channel therein, the at least one second layer channel having at least one dimension smaller than 500 microns; and a first and a second porous membrane valve each associated with both a first layer channel and a second layer channel, wherein each valve hinders fluid flow between the first layer and the second layer, each valve is characterized by an impedance, and the impedance of first valve differs from the impedance of the second valve.

2. The microfluidic device of claim 1 wherein the valves are used to predictably control fluid flow.

3. The microfluidic device of claim 1, wherein the first layer and the second layer are stencil layers.

4. The microfluidic device of claim 1, wherein the first layer and the second layer are adjacent.

5. The microfluidic device of claim 1 further comprising a third layer interposed between the first layer and the second layer, wherein the third layer includes at least one porous membrane.

6. The microfluidic device of claim 5 wherein the at least one porous membrane forms substantially all of the third layer.

7. The microfluidic device of claim 3 wherein the third layer is a stencil layer.

8. The microfluidic device of claim 1 wherein at least one porous membrane valve is constructed by inserting an ingredient selected from the group consisting of a liquid, a solution, a slurry, and a suspension into a microfluidic channel, and then permitting at least partial evaporation of the ingredient.

9. The microfluidic device of claim 1 further comprising a lower support layer.

10. The microfluidic device of claim 1 further comprising a top layer.

11. The microfluidic device of claim 1 wherein the first layer and the second layer are integral.

12. The microfluidic device of claim 1 wherein the first layer and the second layer are held together with pressure.

13. The microfluidic device of claim 1 wherein the first layer and the second layer are thermally bonded together.

14. The microfluidic device of claim 1 wherein the first layer and the second layer are held together with adhesive.

15. The microfluidic device of claim 14 wherein the adhesive is selected from the group consisting of rubber-based adhesives, acrylic-based adhesives, silicone-based adhesives, and gum-based adhesives.

16. The microfluidic device of claim 1 wherein at least one of the first layer and the second layer is self-adhesive.

17. The microfluidic device of claim 16 wherein at least one of the first layer and the second layer comprises an adhesive tape.

18. The microfluidic device of claim 17 wherein the adhesive tape has adhesive on one side.

19. The microfluidic device of claim 17 wherein the adhesive tape has adhesive on both sides.

20. The microfluidic device of claim 17 wherein the adhesive tape is selected from the group consisting of pressure-sensitive tapes, temperature-sensitive tapes, chemically-activated tapes, chemically-activated tapes, and optically-activated tapes.

21. The microfluidic device of claim 1 wherein the first layer and the second layer comprise materials selected from the group consisting of polymers, papers, fabrics, and foils.

22. The microfluidic device of claim 1 wherein the first layer and the second layer comprise polymers selected from the group consisting of polyesters, polyimides, vinyls, acrylics, polycarbonates, polytetraflouroethlenes, polyurethanes, polyethlyenes, polypropylenes, polyvinylidene fluorides, polyethersulfones, ABS, polyphenylene oxides, silicones, and derivatives thereof.

23. The microfluidic device of claim 1 further comprising an outlet port in communication with one of the first and second channels.

24. The microfluidic device of claim 1 wherein the first channel does not penetrate the first layer, and the second channel does not penetrate the second layer.

25. The microfluidic device of claim 1, wherein the first channel defines a trench or groove in the first layer, and the second channel defines a trench or groove in the second layer.

26. The microfluidic device of claim 1 wherein a fluid is input to the device, the device meters a sample of a predetermined volume from the input, and the device splits the sample into multiple portions for further analysis.

27. The microfluidic device of claim 26 wherein the multiple portions are substantially equal volumes.

* * * * *

UNITED STATES PATENT AND TRADEMARK OFFICE
CERTIFICATE OF CORRECTION

PATENT NO. : 6,418,968 B1
DATED : July 16, 2002
INVENTOR(S) : Pezzuto, Marci et al.

It is certified that error appears in the above-identified patent and that said Letters Patent is hereby corrected as shown below:

Column 7,
Lines 5 and 6, the phrase "of first valve" should read -- of the first valve --

Signed and Sealed this

Thirteenth Day of April, 2004

JON W. DUDAS
*Acting Director of the United States Patent and Trademark Office*